(12) United States Patent
Xi et al.

(10) Patent No.: US 10,802,609 B2
(45) Date of Patent: Oct. 13, 2020

(54) REAL HANDWRITING STYLUS AND A TOUCH DEVICE WITH RF TRANSCEIVER FUNCTION

(71) Applicant: GUANGDONG ZONGHUA TOUCH CONTROL TECHNOLOGY CO. LTD., Dongguan, Guangdong (CN)

(72) Inventors: Bangzi Xi, Dongguan (CN); Dezhong Zhu, Dongguan (CN)

(73) Assignee: GUANGDONG ZONGHUA TOUCH CONTROL TECHNOLOGY CO., LTD, Dongguan (CN)

( * ) Notice: Subject to any disclaimer, the term of this patent is extended or adjusted under 35 U.S.C. 154(b) by 0 days.

(21) Appl. No.: 15/567,022

(22) PCT Filed: Nov. 28, 2016

(86) PCT No.: PCT/CN2016/107434
§ 371 (c)(1),
(2) Date: Oct. 16, 2017

(87) PCT Pub. No.: WO2017/185735
PCT Pub. Date: Nov. 2, 2017

(65) Prior Publication Data
US 2018/0217685 A1 Aug. 2, 2018

(30) Foreign Application Priority Data
Apr. 28, 2016 (CN) .......................... 2016 1 0272937

(51) Int. Cl.
*G06F 3/0354* (2013.01)
*G06F 3/044* (2006.01)
*G06F 3/046* (2006.01)

(52) U.S. Cl.
CPC ...... *G06F 3/03545* (2013.01); *G06F 3/03547* (2013.01); *G06F 3/044* (2013.01); *G06F 3/046* (2013.01); *G06F 2203/04104* (2013.01)

(58) Field of Classification Search
CPC .. G06F 3/03545; G06F 3/03547; G06F 3/044; G06F 3/046; G06F 2203/04104
(Continued)

(56) References Cited

U.S. PATENT DOCUMENTS

| 2003/0128195 A1* | 7/2003 | Banerjee | G06F 3/03545 345/179 |
| 2005/0122319 A1* | 6/2005 | Sakurai | G06F 3/03545 345/179 |

(Continued)

FOREIGN PATENT DOCUMENTS

| CN | 101339470 A | 1/2009 |
| CN | 104808814 A | 7/2015 |

(Continued)

OTHER PUBLICATIONS

Mar. 6, 2017 Search Report issued in International Patent Application No. PCT/CN2016/107434.

*Primary Examiner* — Stephen G Sherman

(57) ABSTRACT

A real handwriting stylus and a touch device, including: a stylus shell and a battery, stylus system circuit, touch pressure sensitive components and touch module inside the shell, the components including: a nib, nib touch switch and nib pressure inductor; the circuit including: a charging circuit, power control and shutdown delay circuit, power voltage conversion circuit, function keys, RF modulating and RF transceiver circuit and a signal generating circuit; the RF circuit connects with the inductor and function keys, acquiring the nib pressure, function key, and RF modulation signals; the RF circuit can receive frequency hopping command RF signals of the touch component, then output (Continued)

frequency-hopping signals to the signal generating circuit, acquiring the frequency-hopping signals to proceed frequency hopping operation, therefore the stylus and the touch device have very strong anti-interference features, and the real handwriting written effects, the function keys can define any shortcut keys on external device.

23 Claims, 11 Drawing Sheets

(58) Field of Classification Search
  USPC .............................. 345/179; 179/19.01–19.07
  See application file for complete search history.

(56) References Cited

U.S. PATENT DOCUMENTS

| | | | |
|---|---|---|---|
| 2007/0046649 A1* | 3/2007 | Reiner | G06F 3/03545 345/173 |
| 2009/0079710 A1* | 3/2009 | Lapstun | B41J 2/17503 345/179 |
| 2012/0268428 A1* | 10/2012 | Nakata | G06F 3/044 345/179 |
| 2015/0293627 A1* | 10/2015 | Park | G06F 3/044 345/174 |
| 2016/0188009 A1* | 6/2016 | Katsurahira | G06F 3/046 345/179 |
| 2018/0267634 A1* | 9/2018 | Xi | G06F 3/03545 |

FOREIGN PATENT DOCUMENTS

| | | |
|---|---|---|
| CN | 205068321 U | 3/2016 |
| CN | 105929985 A | 9/2016 |
| CN | 205721670 U | 11/2016 |
| WO | 2015/191807 A1 | 12/2015 |

* cited by examiner

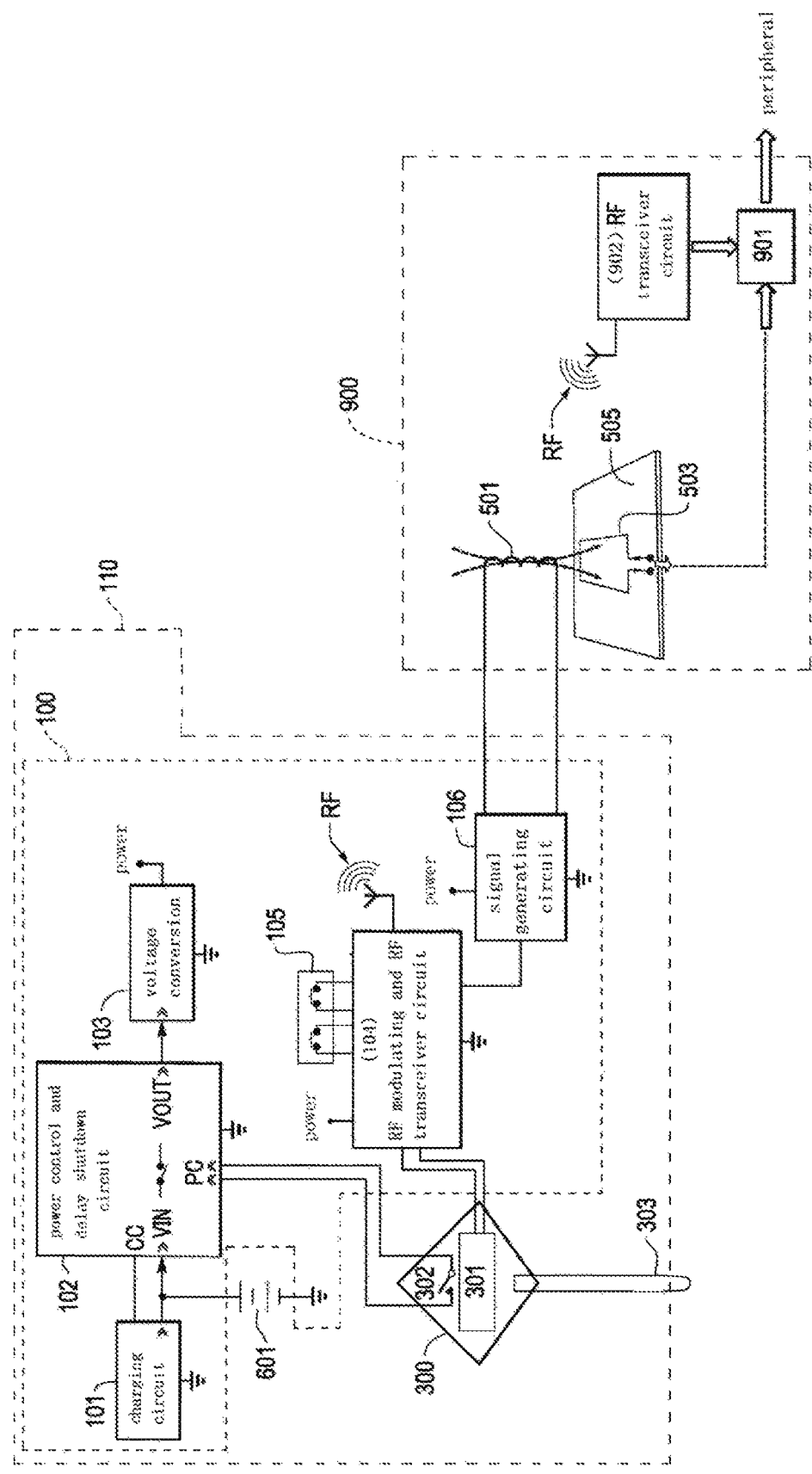
FIG. 2.1

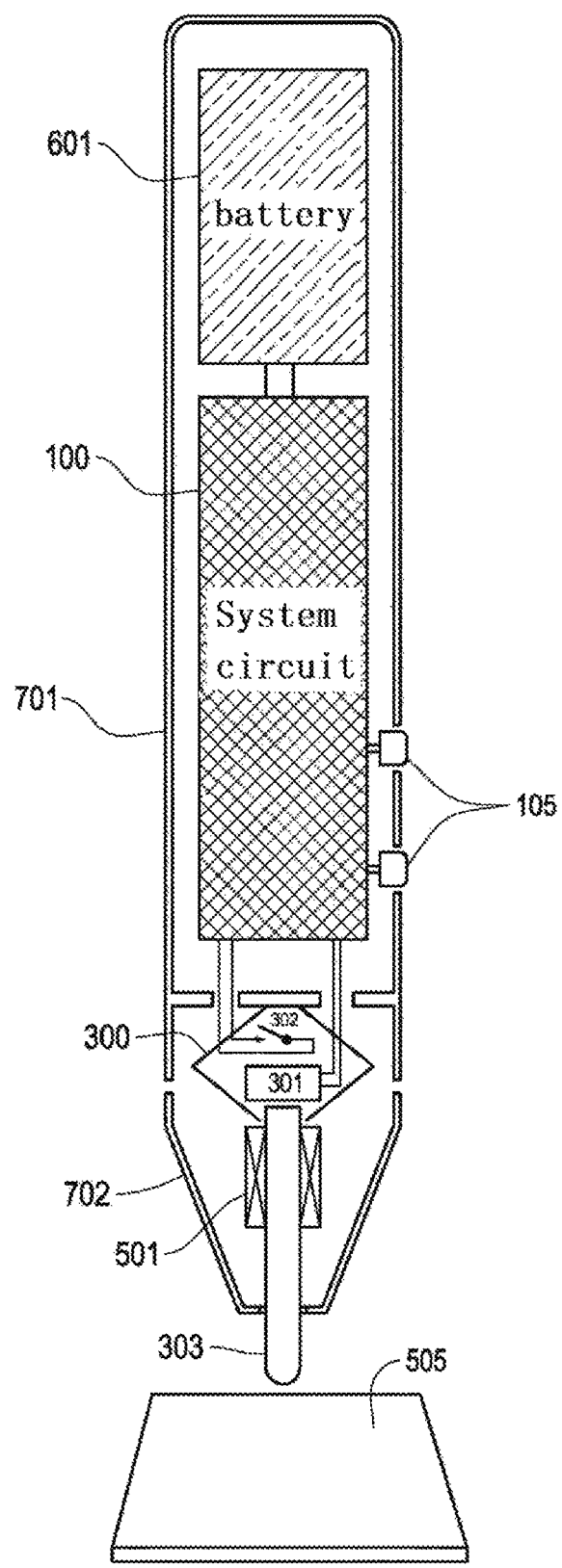
FIG. 2.2

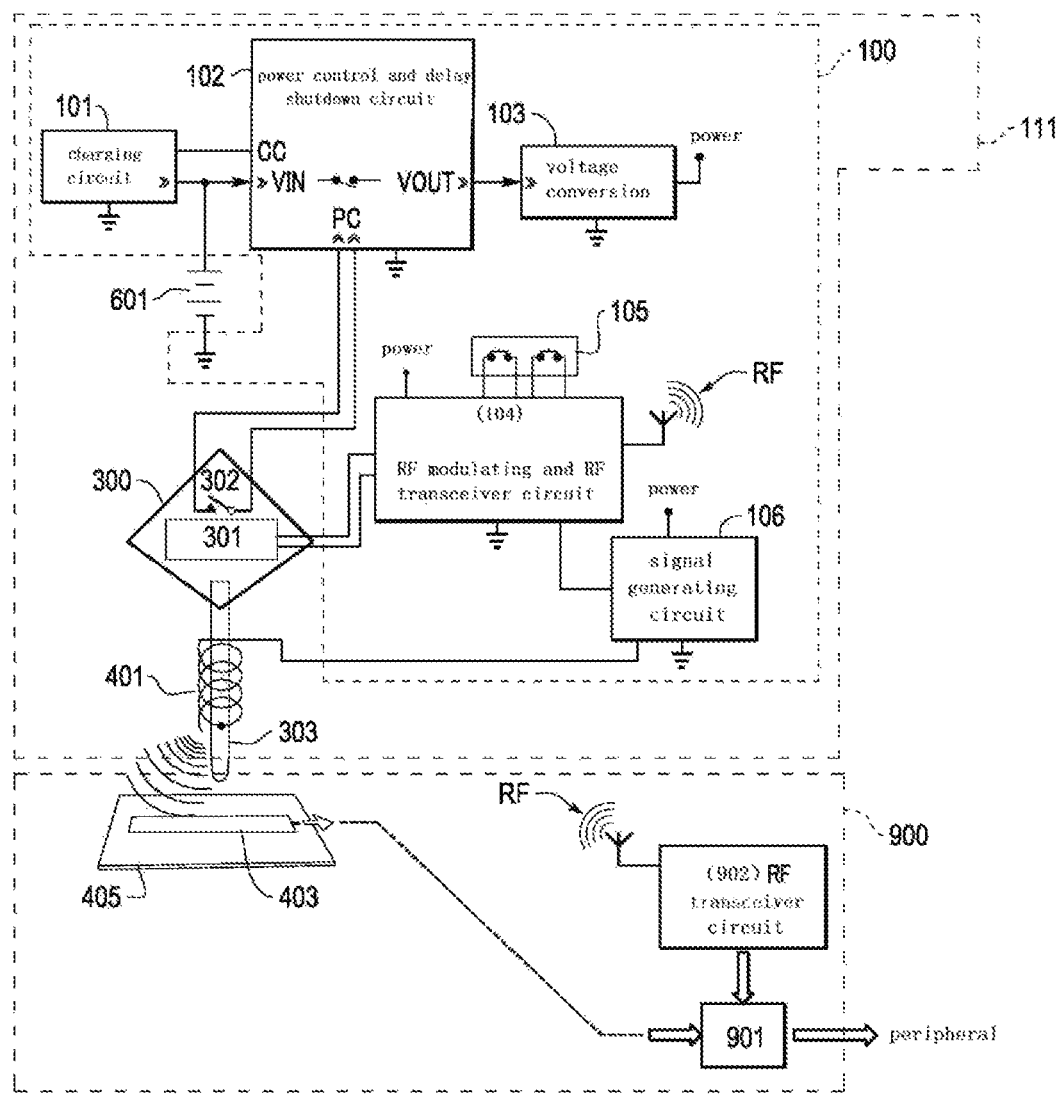
FIG. 3.1

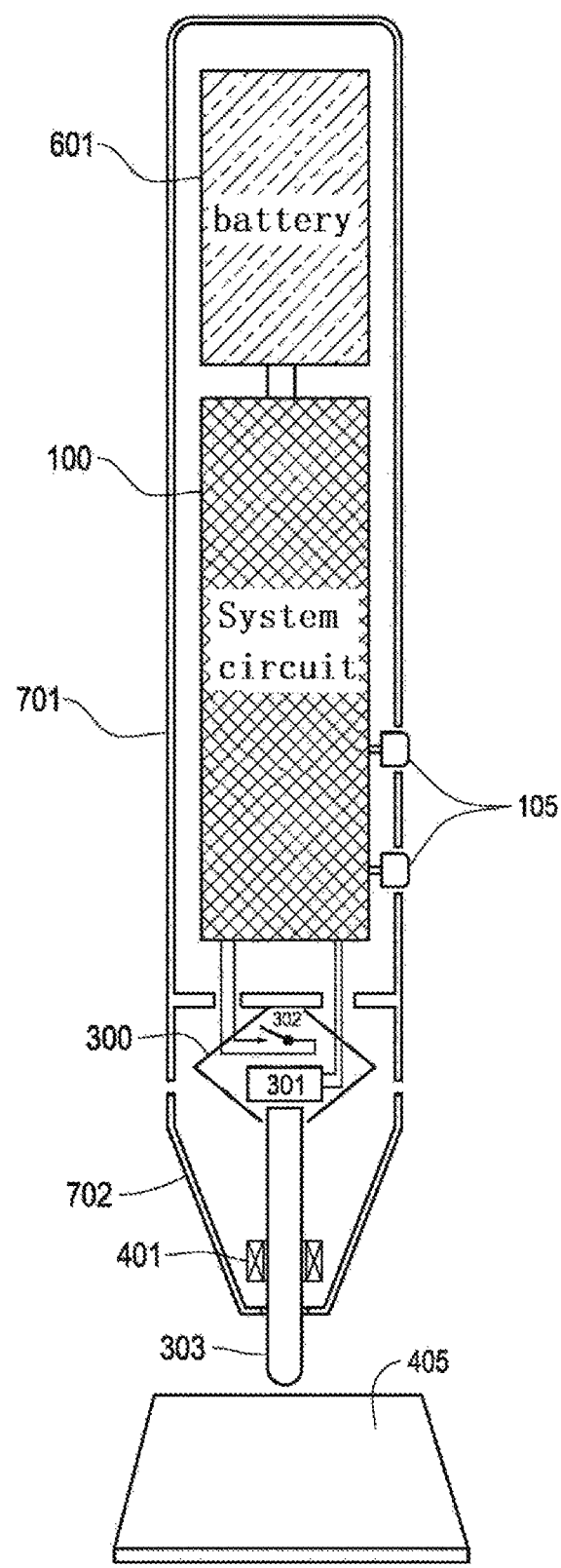
FIG. 3.2

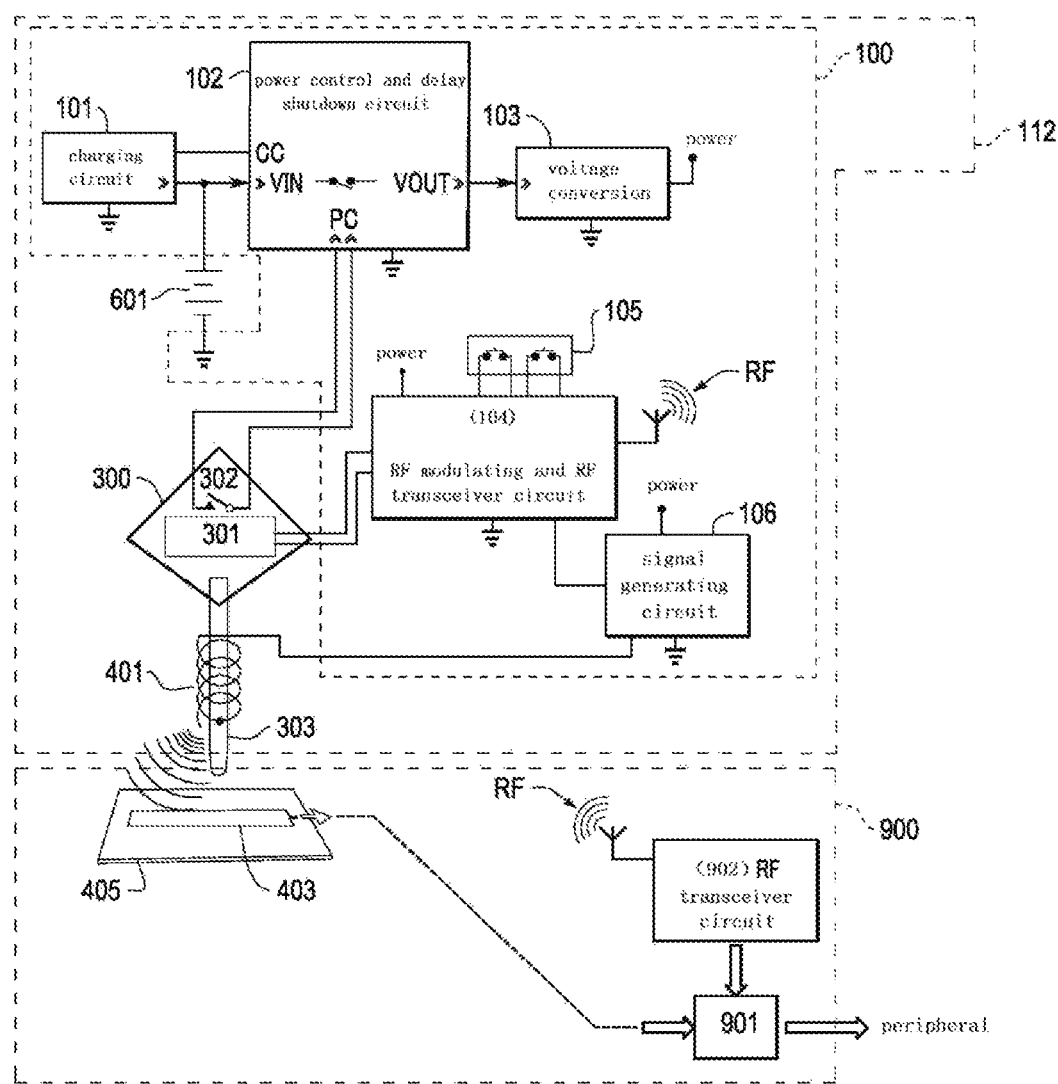
FIG. 4.1

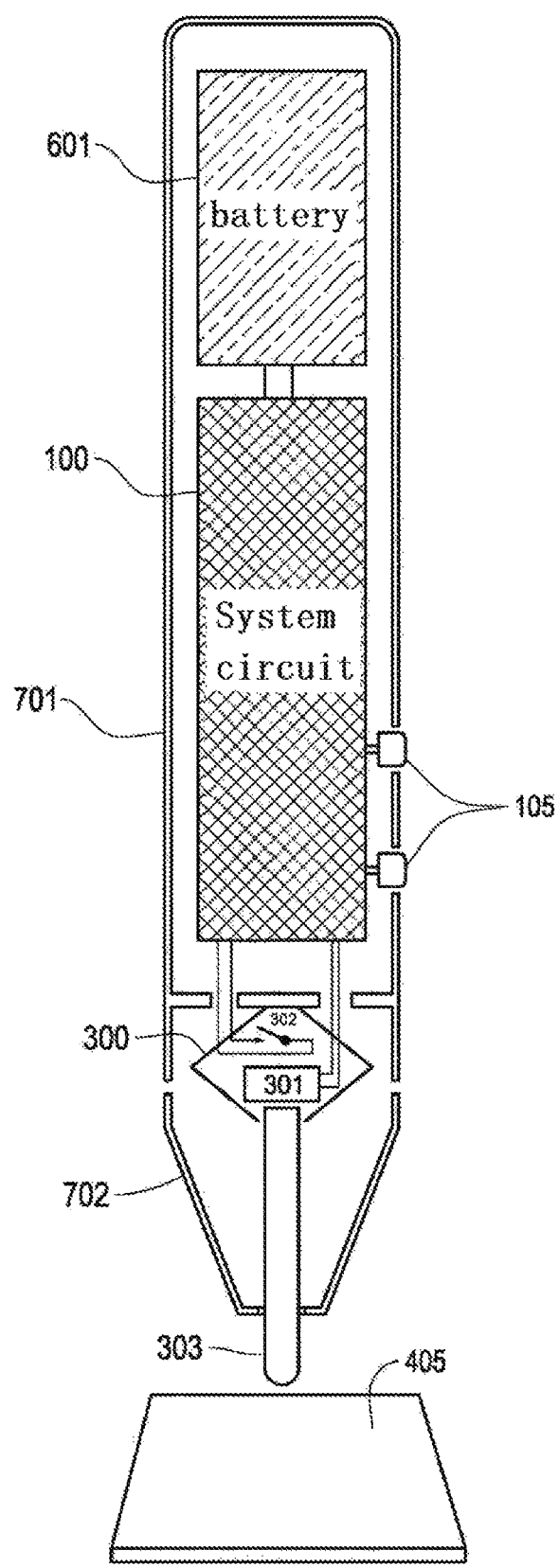
FIG. 4.2

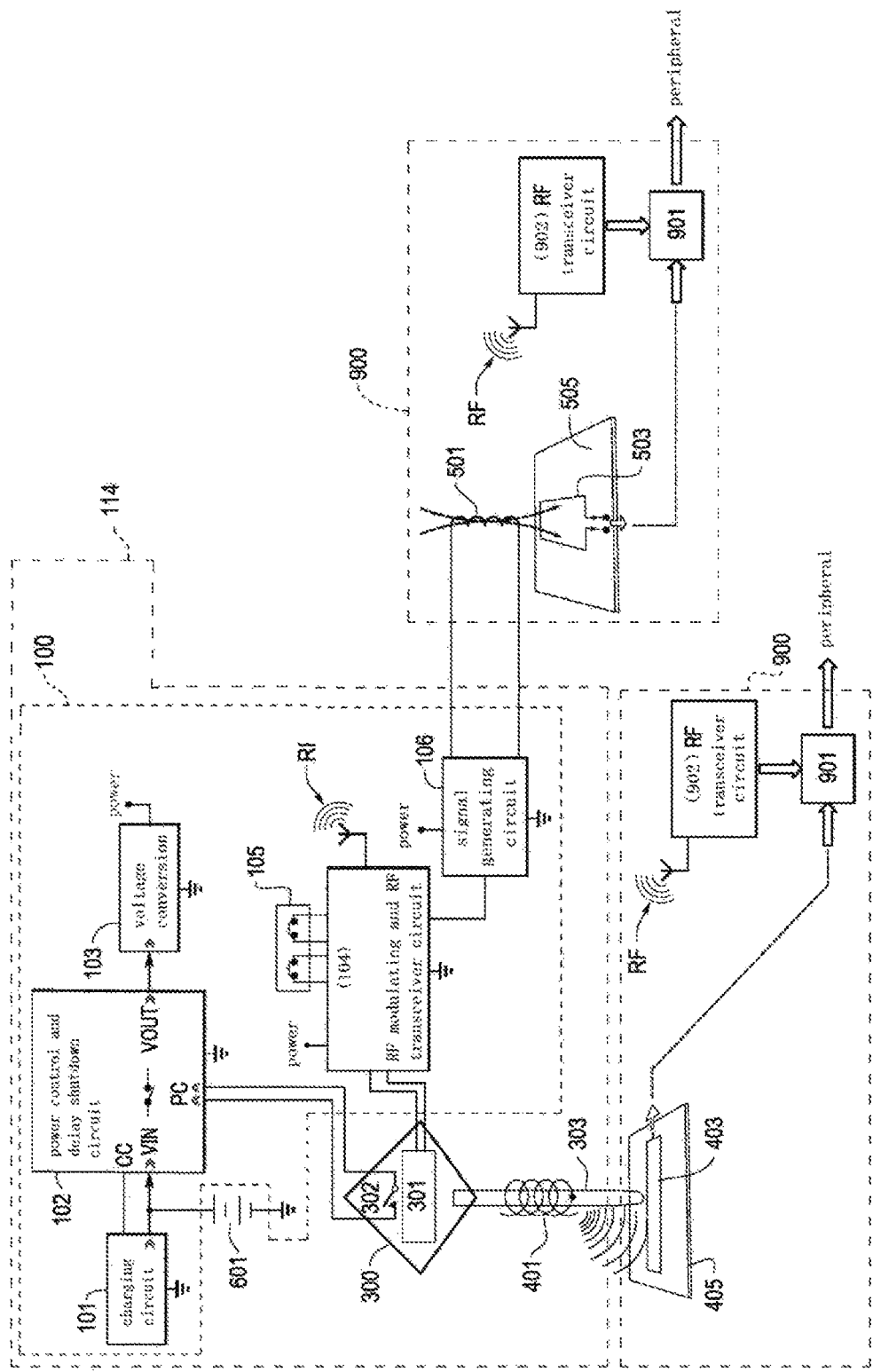
FIG. 4.1

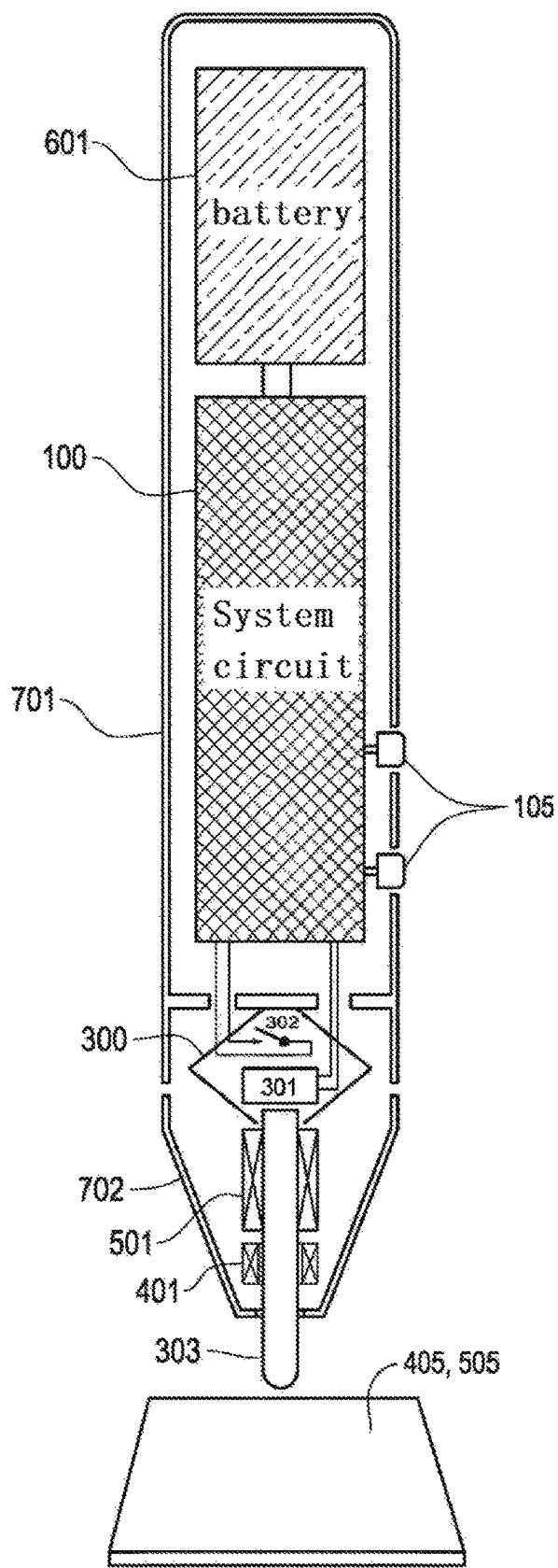
FIG. 5.2

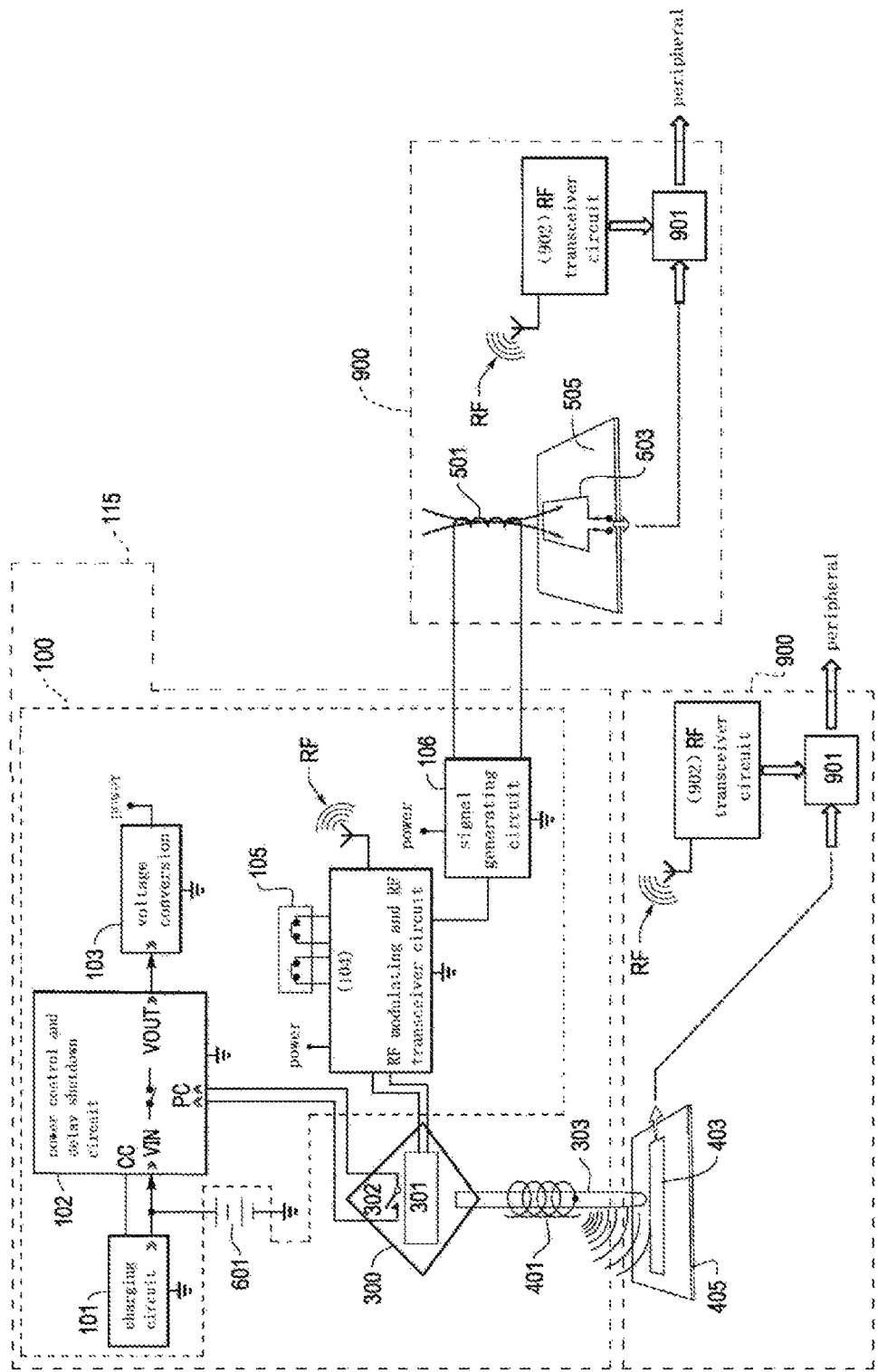
FIG. 6.1

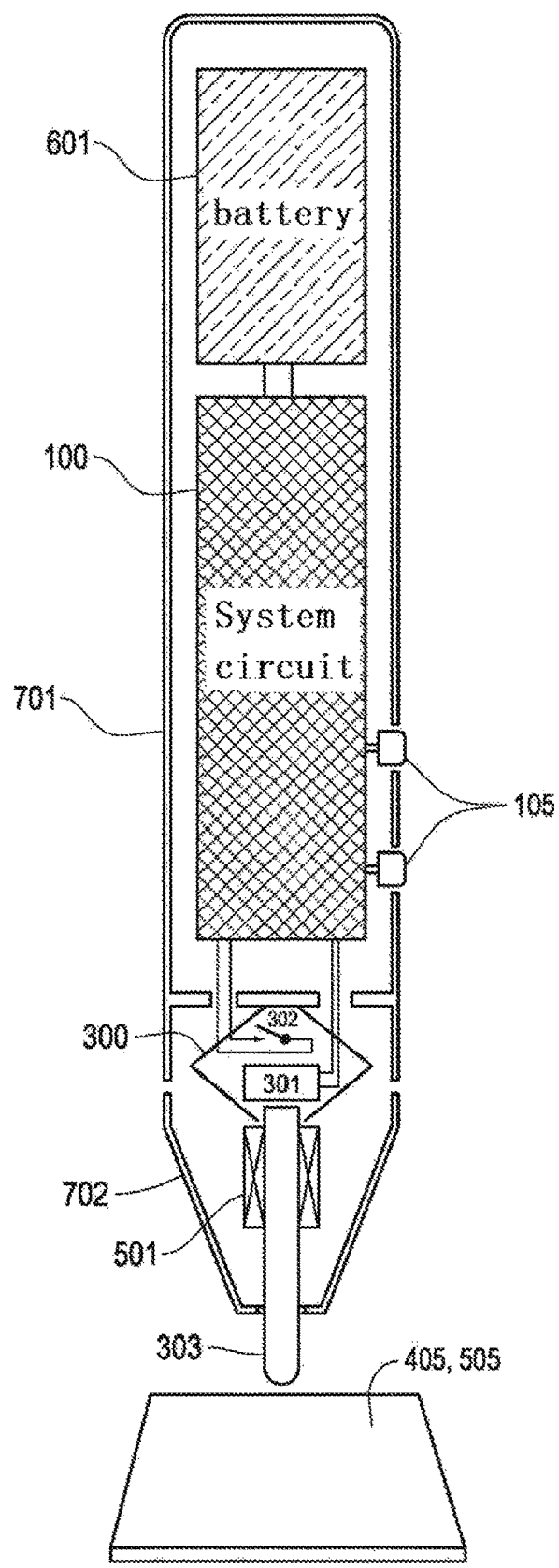
FIG. 6.2

REAL HANDWRITING STYLUS AND A TOUCH DEVICE WITH RF TRANSCEIVER FUNCTION

FIELD OF TECHNOLOGY

This invention relates to a stylus; especially relates to a real handwriting stylus and a touch device, which records the real handwriting of the writer and possesses RF transceivers function.

BACKGROUND TECHNOLOGY

With the progress and development of electronic products, the application of inductors become very extensive. At present, the inductor has two modes: the capacitive mode and the electromagnetic mode, it can achieve handwriting input function via making the touch handwriting stylus keep in touch with the touch-induced active zone of the touch sensor of the touch handwriting input device.

In the application CN200810089922 "capacitive stylus" discloses a capacitive stylus, it includes a conducting plate, a connector and a conducting stylus body, the connector connect the conducting plate with the stylus body, whereby let the stylus body and the conducting plate takes relative motion. Since the connector causes inconvenient operation; and the existing stylus have achieved the simple handwriting function via electrical circuits, with no writing pressure induction function, which cannot output different pressure signals according to the value of the pressure applied to the stylus, which leads to single function and simple output; or, although it maybe have stylus pressure detecting function, is long in pressure detecting distance, poor in writing experience, complicated in implementation and high in cost. Moreover it cannot mirror the handwriting characteristic of the writer accurately.

Furthermore, the exiting stylus usually adopts single mode, and cannot adopt combination of both capacitive mode and electromagnetic mode inductor, and usually is suitable for the capacitive mode or electromagnetic mode inductor only. Moreover, there are various electromagnetic or capacitive styluses that work with fixed-frequency stylus signals, if there is similar or identical stylus signals occurred outside with operating frequency, they are much more liable to be interfered, whereby causing working status unstable.

SUMMARY OF THE INVENTION

In order to overcome these disadvantages, the present invention provides a real handwriting stylus and a touch device which possesses RF transceiver function, it provides an electromagnetic stylus with an electromagnetic mode, a capacitive mode or electromagnetic and capacitive dual modes, and can suit to the capacitive inductor or the electromagnetic inductor, or the both, and it also possesses a real handwriting function with writing pressure induction. Meanwhile, a RF transceiver circuit that can transmit and receive radio-frequency signals is also provided, while the working frequency is interfered by outside it can implement frequency hopping operation, whereby achiving a strong anti-interference function, thus solving problems of unstable status of the stylus if identical or similar signals with the working frequency are happened outside and are much more liable to be interfered by the outside.

The present invention provides a real handwriting stylus with the RF transceiver function, which includes multiple modes touch functions, such as an electromagnetic mode stylus, a first capacitive mode stylus, a second capacitive mode stylus, a third capacitive mode stylus, a first electromagnetic and capacitive dual mode stylus, a second electromagnetic and capacitive dual mode stylus as well as a third electromagnetic and capacitive dual modes stylus. Specifically, the technical solution of the present invention is as follows:

The real handwriting stylus with RF transceiver function includes a stylus shell, a battery inside the stylus shell, a stylus system circuit insides the stylus shell and touch pressure-sensitive components inside the stylus shell, the touch pressure-sensitive components include a nib, a nib touch switch and a nib pressure sensor;

The system circuit includes a charging circuit, a power control and shutdown delay circuit, a power voltage conversion circuit, function keys, a RF modulating and RF transceiver circuit and a stylus signal generating circuit;

The power voltage conversion circuit is connected with the power control and shutdown delay circuit to convert the system power supply into constantly operating supply voltage, The RF modulating and RF transceiver circuit connects with the nib pressure inductor and the function keys, and can acquire nib pressure signals and function keys signals respectively, and RF modulating and output RF modulation signals; the RF modulating and RF transceiver circuit can receive radio-frequency signals, and produce frequency-hopping signals of circuit to the stylus signal.

The stylus signal generating circuit can output electromagnetic signals and/or electrical signals; the stylus signal generating circuit connects with the RF modulating and transceiver circuit, whereby acquiring frequency-hopping signals to proceed frequency hopping operation.

Preferably, electromagnetic signals and/or electrical signals output from the stylus signal generating circuit comprise nib hovering position signals and nib trace signals.

Preferably, the nib pressure sensor is a pressure sensitive resistor.

Preferably, the nib pressure sensor is a pressure sensitive capacitor.

Preferably, the stylus shell includes a stylus shell front-end and a stylus shell rear-end;

the battery and the stylus system circuit is arranged inside the stylus shell rear-end, and the stylus shell rear-end is made from metal conductive materials;

the touch pressure-sensitive components are arranged inside the stylus shell front-end, and the stylus shell front-end is made from insulating materials.

Preferably, the stylus signal generating circuit connects with electromagnetic signal output coils and outputs alternating electromagnetic signals, and the electromagnetic signal output coils are toroidal coils winded with metal wires with an insulating surface.

Preferably, the stylus signal generating circuit connects with an electrical signal radiating antenna and outputs electrical signals, and the electrical signal radiating antenna is an electric conductor which is made from a section of conductor materials.

Preferably, the stylus signal generating circuit connects with the electrical signal radiating antenna and outputs electrical signals, and the nib made from conductor materials can also be used as electrical signal radiating antenna.

Preferably, the nib touch generates pressures which transmit to a nib touch switch and a nib pressure sensor.

Preferably, the power control and shutdown delay circuit of the stylus system circuit is arranged with a power input port connecting with the battery, a power output port connecting with the power voltage conversion circuit, a touch switching signal control port connecting with the nib touch switch; the touch switching signal control port connects with the touch switch to acquire signals, upon conducted signals of the touch switch has been acquired, the power input port and the power output port will be conducted to each other, and the stylus system circuit will enter a working condition; if the short circuit conducted signal connecting with the touch switch have not been received in the working condition for a long time, the connection between the power input port and the power output port will be cut off from each other, and the system circuit will enter a shutdown status;

Preferably, the power control and shutdown delay circuit of the stylus system circuit are also provided with a power charging control port connecting with the charging circuit, it will enter a charging status upon the power charging control port has acquired charging signals, and the connection between the power input port and the power output port will be cut off, the stylus system circuit will be locked in the shutdown status.

The present invention also provides a touch device with the RF transceiver function, the touch device includes multiple modes stylus and touch module with the RF transceiver function, such as an electromagnetic mode touch device, a first capacitive mode touch device, a second capacitive mode touch device, a third capacitive mode touch device, a first electromagnetic and capacitive dual modes touch device, a second electromagnetic and capacitive dual modes touch device as well as a third electromagnetic and capacitive dual modes touch device, the technology solution is as follows:

The touch device with a RF transceiver includes the real handwriting stylus and touch module with the RF transceiver transmission function provided above, and the touch module includes a touch sensor, a touch processor and a RF transceiver connecting to the touch processor, the touch module can receive the radio-frequency signals and electromagnetic signals and/or electrical signals transmitted from the real handwriting stylus.

Preferably, the RF transceiver circuit is a 2.4 GHZ RF transceiver circuit, which includes a blue-tooth transceiver circuit and/or WIFI transceiver circuit.

Preferably, the touch module is an electromagnetic touch module, and the electromagnetic touch module includes an electromagnetic touch sensor, an electromagnetic touch processor and a RF transceiver connecting with the electromagnetic touch processor.

Preferably, the touch module is a capacitive touch module, and the capacitive touch module includes a capacitive touch sensor, a capacitive touch processor and a RF transceiver connecting with the capacitive touch processor.

Preferably, the touch module is an electromagnetic capacitive dual module, and the electromagnetic capacitive dual module includes an electromagnetic module and a capacitive module; the electromagnetic module includes an electromagnetic touch sensor, an electromagnetic touch processor and a RF transceiver circuit, and the capacitive module includes a capacitive touch sensor, a capacitive touch processor and a RF transceiver circuit.

Preferably, the capacitive touch inducting antenna unit of the capacitive touch sensor can receive the electrical signals generated by the real handwriting stylus via the electrical signals radiating antenna, then the electrical signals will be converted to electrically induced signals and input into the capacitive touch processor, and the RF transceiver can receive the radio-frequency signals transmitted by the real handwriting stylus via the RF modulating and RF transceiver circuit, and transmit the signals to the capacitive touch processor, the capacitive touch processor will demodulate the signals to be recognized by an external device and transmit the signals to the external device.

Preferably, the electromagnetic touch inducting antenna unit of the electromagnetic touch sensor of the electromagnetic touch module can receive the alternating electromagnetic signals through the electromagnetic module stylus via the electromagnetic output coils, then convert the alternating electromagnetic signals to the electromagnetic inductive signals and input the electromagnetic touch processor, and the RF transceiver can receive the radio-frequency signals transmitted by the real handwriting stylus via the RF modulating and RF transceiver circuit, and transmit the signals to the electromagnetic touch processor, the electromagnetic touch processor will demodulate the radio-frequency signals to be recognized by an external device and transmit the signals to the external device.

Preferably, the electromagnetic touch inducting antenna unit of the electromagnetic touch module and the capacitive touch inducting antenna unit of the capacitive touch module in the electromagnetic capacitive dual module can acquire alternating electromagnetic signals and electrical signals respectively; the electromagnetic touch inducting antenna unit can convert the alternating electromagnetic signals into electromagnetic inductive signals and input into the electromagnetic touch processor, the RF transceiver will receive the radio-frequency signals transmitted by the real handwriting stylus via the RF modulating and RF transceiver circuit, and transmit the radio-frequency signals to the electromagnetic touch processor, the electromagnetic touch processor can demodulate the radio-frequency signals to be recognized by an external device and transmit the signals to the external device; the capacitive touch inducting antenna unit can convert the electrical signals to electrically induced signals and input into the capacitive touch processor, the RF transceiver circuit can receive the radio-frequency signals transmitted by the real handwriting stylus via RF modulating and RF transceiver circuit and transmit the radio-frequency signals to the capacitive touch processor, the capacitive touch processor can demodulate the radio-frequency signals to be recognized by an external device and transmit the signals to the external device.

Preferably, the electromagnetic touch module of the electromagnetic and capacitive dual touch module is arranged in the rear of the capacitive touch module, and the electromagnetic touch processor transmits a shutdown signal of the capacitive touch module to the capacitive touch processor, whereby keeping the electromagnetic touch mode prior.

Preferably, the capacitive touch module of the electromagnetic and capacitive dual touch module is arranged in the rear of the electromagnetic touch module, and the capacitive touch processor transmits a shutdown signal of the electromagnetic touch module to the electromagnetic touch processor, whereby keeping the capacitive touch mode taking prior.

Preferably, signals to be recognized by an external device include signals of the nib hovering position, nib trace signals, the stylus pressure signals, and/or the signals of function keys;

Preferably, the external device is a capacitive touch sensor, an electromagnetic touch sensor, computer and/or cellphone.

Compared with existing techniques, the real handwriting stylus and the touch device described in the present invention have following beneficial effects:

1) The real handwriting stylus and the touch device with the RF transceiver function includes provided in the present invention possesses multiple modes touch function, such as the electromagnetic mode, capacitive mode as well as the electromagnetic and capacitive dual modes, and can adapt to capacitive inductor and electromagnetic inductor.

2) While writing with the real handwriting stylus and the touch device with the RF transceiver function described in the present invention, it can output different pressure signals based on the input pressure value applied on the stylus, thus generating the real handwriting of the writer.

3) The real handwriting stylus and the touch device with the RF transceiver function provided in the present invention is arranged with a RF transceiver which can transmit and receive radio-frequency signals, and it can implement frequency hopping operation, whereby obtaining very strong anti-interference function when the working frequency encounters interference from the environment.

4) With the real handwriting stylus with the RF transceiver-receive function circuit described in the present invention, the signals of nib pressure and function keys can be received more sensitively, and with the modulating circuit, it can demodulate the electromagnetic signals and/or electrical signals then transmit the signals to the corresponding touch module correctly and timely, and finally it can output accurate signals correctly and timely which real-time reflect the real handwriting of the writer.

5) The real handwriting stylus and the touch device with the RF transceiver-receive function described in the present invention are easy to operate, have stylus pressure detecting function, with good experience in writing, easy implementation, and can mirror the handwriting characteristic of the writer accurately.

BRIEF DESCRIPTION OF THE DRAWINGS

FIG. 2.1 shows a structure diagram of the embodiment of the electromagnetic touch device of the invention.

FIG. 2.2 shows a circuit diagram of the electromagnetic touch device of the embodiment of the invention.

FIG. 3.1 shows a structure diagram of the first capacitive touch device of the embodiment of the invention.

FIG. 3.2 shows a circuit diagram of the first capacitive touch device of the embodiment of the invention.

FIG. 4.1 shows a structure diagram of the second capacitive touch device of the embodiment of the invention.

FIG. 4.2 shows a circuit diagram of the second capacitive touch device of the embodiment of the invention.

FIG. 5.1 shows a structure diagram of the first electromagnetic and capacitive touch device of the embodiment of the invention.

FIG. 5.2 shows a circuit diagram of the first electromagnetic and capacitive touch device of the embodiment of the invention.

FIG. 6.1 shows a structure diagram of the second electromagnetic and capacitive touch device of the embodiment of the invention.

FIG. 6.2 shows a circuit diagram of the second electromagnetic and capacitive touch device of the embodiment of the invention.

EMBODIMENTS

Figure 1:
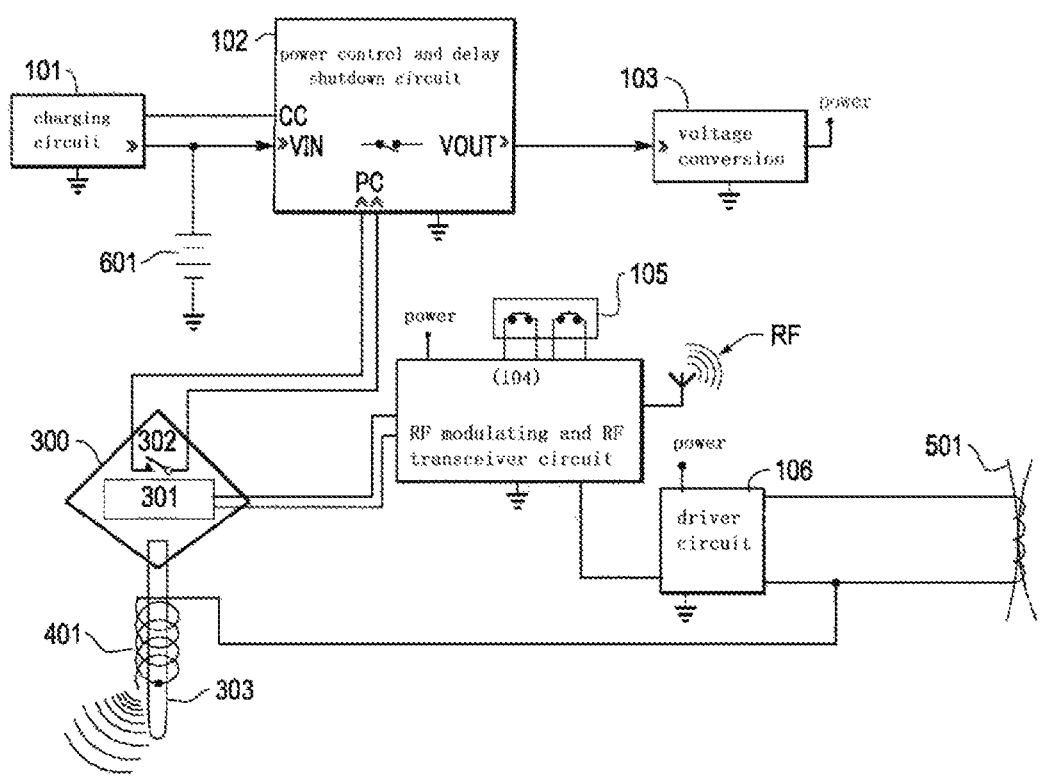
FIG. 1 shows a circuit diagram of the real handwriting stylus with the RF transceiver function of the embodiment of the invention.

The technical solutions of examples of the present application are described clearly and completely as follows. Obviously, the described examples are just some not all examples of the present application. The protection scope of the present application is not defined by examples of the present application provided below. In contract, they are just selected examples of the present application. Based on examples of the present application, other examples that can be obtained by those skilled in the art without paying any creative work belong to the protection scope of the present application.

Example 1

The real handwriting stylus disclosed herein includes a stylus shell, a battery inside the stylus shell, a stylus system circuit 100 insides the stylus shell and touch pressure-sensitive components 300 insides the stylus shell, and the stylus shell includes a shell front-end and a stylus shell rear-end; a battery 601 and a stylus system circuit 100 both are arranged insides the stylus shell rear-end, and the stylus shell rear-end is made from metal conductive materials; a touch pressure-sensitive component 300 is arranged insides the stylus shell front-end, and the stylus shell front-end is made from insulating materials.

FIG. 1 shows a circuit diagram of the real handwriting stylus with the RF transceiver function of the embodiment of the invention, and the stylus system circuit 100 includes a charging circuit 101, a power control and shutdown delay circuit 102, a power voltage conversion circuit 103, function keys 105, a RF modulating and RF transceiver circuit 104 and a stylus signal generating circuit 106; the touch pressure-sensitive components 300 include a nib 303, a nib touch switch 302 and a nib pressure sensor 301.

The nib pressure sensor 301 is a pressure sensitive resistor or a pressure sensitive capacitor, while writing with the stylus, the nib 303 of the touch pressure-sensitive components 300 touches and generates touch pressures, the touch pressures will be transmitted to the nib touch switch 302, and the touch pressures of the nib touch the nib touch switch 302, whereby making the nib touch switch conducted to each other; and the touch pressures of the nib will be transmitted to the nib pressure sensor 301 simultaneously, thereby the resistance value or capacitance value of the nib pressure sensor 30 is changed accordingly with the change of value of the touch pressure of the nib.

The battery 601 is removably disposable-battery and/or rechargeable, in the present embodiment, the battery 601 at least includes a rechargeable battery, the charging circuit 101 can be a contact wired charging circuit, and can also be a non-contact wireless charging circuit.

The power voltage conversion circuit 103 is connected with the power control and shutdown delay circuit 102, whereby converting the system power supply to constant operating supply voltage.

The power control and shutdown delay circuit 102 is arranged with a power input port VIN connecting with the battery, a power output port VOUT connecting with the power voltage conversion circuit 103, a touch switching signal control port PC connecting with the nib touch switch 302; the touch switching signal control port PC is connected with the touch switch 302 and acquired switching signals, upon the conducted signals of the touch switch 302 is acquired, the connection between the power input port VIN and the power output port VOUT will be conducted from each other, then the stylus system circuit 100 will start supplying power and enter a working condition; while the conducted signals connecting with the touch switch 302 are not received for a long time in the working condition, the connection between the power input port VIN and the power output port VOUT will be cut off from each other, and the stylus system circuit 100 will enter a power off status.

The power control and shutdown delay circuit 102 is also arranged with a power charging control port CC connected with the charging circuit 101, while the power charging control port CC has acquired charging signals and entered a charging status, the connection between the power input port VIN and the power output port VOUT will be cut off from each other, and the stylus system circuit 100 will be locked in the power off status to keep charging.

The RF modulating and RF transceiver circuit 104 connects with the nib pressure inductor 301 and the function keys 105, the function keys 105 can be one or more keys, and are arranged with two keys in the present embodiment. The RF modulating and RF transceiver circuit 104 can acquire pressure sensitive resistor signals or pressure sensitive capacitor signals from the nib pressure sensor 301, as well as the function key signals acquired from the function keys 105 are RF modulated and output the radio-frequency signals; the RF modulating and RF transceiver circuit 104 can also receive RF signals, and it will output frequency-hopping signals to the signal generating circuit 106 while the interference signals are included in the RF signals. The RF modulating and RF transceiver circuit 104 can continuously output frequency-hopping signals until no interference signals are received.

The signal generating circuit of the stylus 106 is a phase-locked loop oscillation circuit, it connects with the RF modulating and RF transceiver circuit 104 to acquire frequency-hopping signals, the signal generating circuit of the stylus 106 can output electromagnetic signals, electrical signals or electromagnetic electrical signals, while receiving the frequency-hopping signals from the RF modulating and RF transceiver circuit 104, the signal generating circuit of the stylus 106 will have the frequency modulated, to a new working frequency point, in order to output electromagnetic signals and/or electrical signals, and the signal generating circuit of the stylus 106 can have the frequency modulated continuously.

Specifically, the signal generating circuit of the stylus 106 connects with the electromagnetic signals output coils 501 and outputs alternating electromagnetic signals, the signal generating circuit of the stylus 106 connects with the electrical signals radiating antenna 401 and outputs electrical signals.

The electromagnetic signal output coils 501 are toroidal coils, which are tightly winded by at least one layer of metal wires with an insulating surface for multiple turns, and the metal wires can be enameled copper wires or silver wires, also can be cotton covered copper or silver wires, and may also be a cotton covered copper or silver wires. There can be arranged a magnetic core in the coils, which can reduce the volume of the electromagnetic signal output coils 501, whereby enhancing the signal output strength and output efficiency of the electromagnetic signal output coils 501, and the electromagnetic signal output coils 501 are annular and arranged around the nib inside the shell front-end.

The electrical signal radiating antenna 401 is a section of arbitrarily shaped electrical conductor, can be annular metals, conductive rubbers or a section of frizzy wires, and it is arranged around the nib 303 inside the shell front-end.

The nib 303 made from the conductive materials can also be used as the electrical signal radiating antenna 401, so that it is not necessary to specially arrange a conductor as the electrical signal radiating antenna, thus reducing the components, volume and saving costs.

On the basis that the nib 303 made from the conductive materials is used as the electrical signal radiating antenna 401, and meanwhile arranged another section of electrical conductors to be used as the electrical signal radiating antenna and connected with the nib 303. In this configuration, the electrical signals output more accurately, and enhance the sensitivity of the stylus.

The stylus outputs the nib hovering position signals and nib trace signals when in use to external device via the electrical signals and/or electromagnetic signals finally, outputs the signal pressures of the stylus and the function key signals to external device via radio-frequency signals finally, and the function keys 105 can be defined as any functions at the external device. If the external device is a laptop, it can be defined as left/right mouse buttons, and can also be defined as a switch key of APP, a drawing erasing key, a zoom shortcut key, a screenshot key, and so on.

If the signal generating circuit of the stylus 106 is only arranged with the electromagnetic output coils 501, it can output electromagnetic signals only. By this time, the real handwriting stylus is an electromagnetic mode stylus 110.

If the signal generating circuit of the stylus 106 is only arranged with the electrical signals radiating antenna 401, it can output electrical signals only, and the electrical signal radiating antenna 401 can be made from a section of arbitrary shaped electrical conductors. By this time, the real handwriting stylus is a first capacitive mode stylus 111.

If the signal generating circuit of the stylus 106 is only arranged with the electrical signal radiating antennas 401, it can output electrical signals only, and the nib 303 made from conductive materials is also used as the electrical signal radiating antenna 401. By this time, the real handwriting stylus is a second capacitive mode stylus 112.

If the signal generating circuit of the stylus 106 is only arranged with electrical signal radiating antennas 401, it can output electrical signals only, and the nib 303 made from conductive materials is also used as electrical signal radiating antenna 401, meanwhile another section of electrical conductors is also arranged as the electrical signal radiating antenna and connected with the nib 303. By this time the real handwriting stylus is a third capacitive mode stylus 113.

If the signal generating circuit of the stylus 106 are both arranged with the electromagnetic output coils 501 and the electrical signal radiating antenna 401, it can output electromagnetic signals and electrical signals, and the electrical signal radiating antenna 401 is made from a section of arbitrary shaped electrical conductors. By this time the real handwriting stylus is a first electromagnetic and capacitive dual mode stylus 114.

If the signal generating circuit of the stylus 106 are both arranged with the electromagnetic output coils 501 and the electrical signal radiating antenna 401, it can output electromagnetic signals and electrical signals, and the nib 303 made from conductive materials is also used as the electrical signal radiating antenna 401. By this time the real handwriting stylus is a second electromagnetic and capacitive dual mode stylus 115.

If the signal generating circuit of the stylus 106 are both arranged with the electromagnetic output coils 501 and the electrical signal radiating antenna 401, it can output electromagnetic signals and electrical signals, and the nib 303 made from conductive materials is also used as electrical signal radiating antenna 401, meanwhile another electrical conductor is arranged as electrical signal radiating antenna and connected with the nib 303. By this time the real handwriting stylus is a third electromagnetic and capacitive dual mode stylus 116.

Example 2

The present embodiment provides a real handwriting electromagnetic touch device with RF transceiver function, it includes the electromagnetic mode stylus 110 and the electromagnetic touch module described in Example 1, the electromagnetic touch module includes an electromagnetic touch sensor 501, an electromagnetic touch processor 901 and a RF transceiver 902 connecting with the electromagnetic touch processor 901, and the RF transceiver 902 can be 2.4 GHZ RF transceiver, and can be a Bluetooth transceiver circuit or a WIFI transceiver circuit.

FIG. 2.1 shows a structure diagram of the electromagnetic touch device of the present embodiment, and the external of the real handwriting stylus is packaged with a stylus shell, a battery 601 and a stylus system circuit 100 are arranged inside the stylus shell rear-end 701, function keys 105 connected with stylus system circuit 100 are arranged outside of the stylus shell rear-end, touch pressure-sensitive components 300 are arranged inside the stylus shell rear-end 702, the electromagnetic signal output coils 501 are arranged around the nib 303; and the electromagnetic touch sensor 505 includes the electromagnetic touch processor 901, it can receive the electromagnetic signals from the real handwriting stylus.

FIG. 2.2 shows a circuit diagram of the electromagnetic touch device of the present embodiment, it includes circuits of the electromagnetic mode stylus 110 and the electromagnetic touch module circuit described in Example 1, the electromagnetic touch sensor antenna unit 503 of the electromagnetic touch sensor 505 of the electromagnetic touch module receives alternating electromagnetic signals generated by the electromagnetic mode stylus via the electromagnetic output coils 501, then converting the alternating electromagnetic signals to electromagnetic induced signals and input into the electromagnetic touch processor 901, and the electromagnetic touch processor 901 can demodulate the signals to be recognized by an external device and transmit the signals to the external device, the signals to be recognized by the external device comprise the nib hovering position signals and the nib trace signals.

The RF transceiver 902 connected with electromagnetic touch processor 901 can receive the radio-frequency signals transmitted by the real handwriting stylus via the RF modulating and RF transceiver circuit 104 and transmit the radio-frequency signals to the electromagnetic touch processor, the electromagnetic touch processor 901 demodulates the radio-frequency signals to be recognized by an external device and transmit the signals to the external device, the signals to be recognized by the external device include the pressure signals of the stylus and the function key signals.

The external device can be the electromagnetic touch sensor 505 of the electromagnetic touch device described in the present embodiment, a computer and/or cellphone;

Wherein, the electromagnetic touch sensor 505 comprises one or more electromagnetic touch inducting antenna unit 503.

When acceptance of the electromagnetic touch inducting antenna unit 503 of the electromagnetic touch module 900 for the alternating electromagnetic signals transmitted by the stylus is strongly interfered and causes the working status unstable, the electromagnetic touch module 900 will transmit radio-frequency signals of hopping to a new working frequency point via the RF transceiver 902 inside the touch module to the RF modulating and RF transceiver circuit 104 of the stylus, upon the RF modulating and RF transceiver circuit 104 of the electromagnetic mode stylus 110 have received the radio-frequency signals, it will transmit frequency-hopping signals to the signal generating circuit of the stylus 106, thereby controlling the signal generating circuit of the stylus 106 to hop to a new working frequency point for work. If the electromagnetic touch inducting antenna unit 503 of the electromagnetic touch module 900 can still receive interference, the RF modulating and RF transceiver circuit 104 and the signal generating circuit of the stylus 106 will hop to another new working frequency point to try to avoid interference according to the hopping frequency approach, the electromagnetic touch module 900 and the electromagnetic mode stylus 110 will continuously use the hopping frequency approach to try to eliminate interference, till hopping to a corresponding frequency point without interference and keep to work on the frequency point, thereby achieving the anti-interference function.

Example 3

The first capacitive touch real handwriting device with a RF transceiver function described in the present embodiment includes the first capacitive mode stylus 111 and a capacitive touch module described in Example 1, and the capacitive touch module includes a capacitive touch sensor 405, a capacitive touch processor 801 and a RF transceiver circuit 802 connecting with the capative touch processor 801, the RF transceiver circuit 802 can be a 2.4 GHZ RF transceiver circuit, a Bluetooth transmit-receive circuit, or a WIFI transmit-receive circuit.

FIG. 3.1 shows a structure diagram of the first capacitive touch device of the present embodiment, the external of the real handwriting stylus is packaged with a stylus shell, a battery 601 and a stylus system circuit 100 is arranged inside the stylus shell rear-end 701, function keys 105 connected with stylus system circuit 100 are arranged outside of the stylus shell rear-end, touch pressure-sensitive components 300 are arranged inside the stylus shell rear-end 702, the electrical signal radiating antenna 401 made from a section of arbitrarily shaped electrical conductors is arranged around the nib 303; a capacitive touch processor 801 is included in capacitive touch inductors 405, which can receive the electrical signals from the real handwriting stylus.

FIG. 3.2 shows a circuit diagram of the first capacitive touch device of the present embodiment, it includes a circuit of the first capacitive mode stylus 111 and a circuit of the capacitive touch module in Example 1, the electrical signal radiating antenna 401 of the capacitive touch inductors 405 of the capacitive touch module receives the electrical signals generated from the capacitive mode stylus 111 via the electrical signal radiating antenna 401, then the electrical signals will be converted to field-induced signals and input into the capacitive touch processor 801, the capacitive touch processor 801 can demodulate the field-induced signals to be recognized by an external device and transmit the signals to the external device, the signals to be recognized by the external device include nib hovering position signals, and nib trace signals.

The RF transceiver circuit 802 connecting with the capacitive touch processor 801 receives the radio-frequency signals transmitted by the real handwriting stylus via the RF modulating and RF transceiver circuit 104 and transmits to the capacitive touch processor 801, the capacitive touch processor 801 will demodulate the radio-frequency signals to be recognized by an external device and transmit the signals to the external device, and the signals be recognized by an external device include stylus pressure-sensitive signals and function key signals.

The external device can be the capactive touch sensor 405 of the capacitive touch device described in the present embodiment, computer and/or cellphone.

Wherein, signals to be recognized by the external device include nib dangling position signals, handwriting trace signals, stylus pressure-sensitive signals and/or function key signals.

Wherein, the capacitive touch inductors 405 comprise one or more of the capacitive touch inductor antenna unit 403.

When acceptance of the capacitive touch inducting antenna unit 403 of the capacitive touch module 800 for the alternating capacitive signals transmitted by the stylus is strongly interfered and causes the working status unstable, the capacitive touch module 800 will transmit radio-frequency signals of a command hopping to a new working frequency to the RF modulating and RF transceiver circuit 104 of the stylus via the RF transceiver circuit 802 inside the touch module, upon the RF modulating and RF transceiver circuit 104 of the capacitive mode stylus 110 have received radio-frequency signals, it will transmit frequency-hopping signals to the signal generating circuit 106, whereby controlling the signal generating circuit 106 to hop to a new working frequency for work. If the capacitive touch inducting antenna unit 403 of the capacitive touch module 800 can still receive interference, the RF modulating and RF transceiver circuit 104 and the signal generating circuit 106 will hop to another new working frequency to try to avoid interference according to the frequency hopping pattern described above, the capacitive touch module 800 and the capacitive mode stylus 110 will continuously use the frequency hopping pattern described above to try to eliminate interference, till hopping to a corresponding frequency point without interference and keeping to work on the frequency point, whereby achieving the anti-interference function.

Example 4

The present embodiment provides the second capacitive real handwriting touch device with a RF transceiver function includes the second capacitive mode stylus 112 and the capacitive touch module described in Example 1, the difference between Example 3 and the present embodiment is, the nib 303 made from conductive materials is also used as the electrical signal radiating antenna 401. FIG. 4.1 shows a structure diagram of the second capacitive touch device of the embodiment of the present invention, no any other electrical conductors has been arranged around the nib 303.

FIG. 4.2 shows a circuit diagram of the second capacitive touch device of the embodiment of the invention, the signal generating circuit 106 is directly connected with the nib 303 and outputs electrical signals.

Example 5

The third real handwriting capacitive touch device with the RF transceiver function includes the third capacitive mode stylus 113 and capacitive touch module described in Embodiment 1, the difference between Example 3 and the present embodiment is, the nib 303 made from conductive materials is also used as the electrical signal radiating antenna. Meanwhile, another section of electrical conductors is also arranged as electrical signal radiating antenna 401 and connected with the nib 303, refer to FIG. 3.1, the circuit of the present embodiment is comprised by connecting the electrical signal radiating antenna 401 made from electrical conductors with the nib.

Example 6

The present embodiment provides a first real handwriting electromagnetic and capacitive dual touch device with the RF transceiver function includes the first electromagnetic and capacitive dual mode stylus 114 and the electromagnetic and capacitive dual touch module described in Example 1, the electromagnetic and capacitive dual module includes an electromagnetic module and a capacitive module, the electromagnetic module refers to Example 2, and the capacitive module refers to Example 3.

FIG. 5.1 shows a structure diagram of the first electromagnetic and capacitive touch device of the present embodiment, an electrical signal radiating antenna 401 made from a section of arbitrarily shaped electrical conductors is added nearby the nib 303 on FIG. 2.2 of Example 2.

FIG. 5.2 shows a circuit diagram of the first electromagnetic and capacitive touch device of the present embodiment, an electromagnetic touch module is added on FIG. 3.2 of Example 3.

The electromagnetic touch inductor antenna unit 503 of electromagnetic touch module 900 and the capacitive touch inductor antenna unit 403 of the capacitive touch module 800 of the first electromagnetic and capacitive dual mode touch device acquire alternating electromagnetic signals and electrical signals, respectively.

Upon the electromagnetic touch module of the first electromagnetic and capacitive dual mode touch module 900 is arranged behind the capacitive touch module 800, the electromagnetic touch processor 901 transmits capacitive touch module shutdown signals to the capacitive touch processor 801, whereby keeping the electromagnetic touch mode prior.

Upon the capacitive touch module of the first electromagnetic and capacitive dual touch module 900 is arranged behind the electromagnetic touch module 800, the capacitive touch processor 801 transmits electromagnetic touch module shutdown signals to the electromagnetic touch processor 901, whereby keeping the capacitive touch mode prior.

Example 7

The second real handwriting electromagnetic and capacitive dual touch device with the RF transceiver function provided in the present embodiment includes a second electromagnetic and capacitive dual mode stylus 115 and the capacitive touch module described in Example 1, the difference between Example 6 and the present embodiment is, the nib 303 made from conductive materials is also used as the electrical signal radiating antenna 401. FIG. 6.1 shows a structure diagram of the second electromagnetic and capacitive touch device of the present embodiment, and no any other electrical signal radiating antenna made from electrical conductors has been arranged around the nib 303.

FIG. 6.2 shows a circuit diagram of the second electromagnetic and capacitive touch device of the present embodiment, and the signal generating circuit 106 directly connects with the nib 303 and outputs electrical signals.

Example 8

The third real handwriting electromagnetic and capacitive dual touch device with the RF transceiver function provided in the present embodiment includes a third electromagnetic and capacitive dual mode stylus 116 and the capacitive touch module described in Example 1, the difference between Example 3 and the present embodiment is, the nib 303 made from conductive materials is also used as electrical signal radiating antenna, and meanwhile another section of electrical conductors is also arranged to be used as the electrical signal radiating antenna 401 and connected with the nib 303. Referring to FIG. 3.1, the circuit of the present embodiment is comprised by connecting the electrical signal radiating antenna 401 made from electrical conductors with the nib.

With the real handwriting stylus with the RF transceiver function and a touch device included the real handwriting stylus with a RF transceiver function provided in the present invention, nib hovering position signals, nib trace signals, nib pressure signals and function button signals can be obtained precisely and timely according to the use status, it is sensitive to receive the nib pressure and the function signals, and finally generates the real handwriting of a writer in real-time. In addition, it can proceed frequency hopping operation to achieve the anti-interference function when the working frequency are disturbed, and the real handwriting stylus with the RF transceiver function and the touch device comprising the real handwriting stylus with the RF transceiver function can be possessed very strong anti-interference function, more sensitive to response and more real for handwriting.

The above description are merely preferable examples of the present application, rather than the limitation to the present application. For those skilled in the art, the present application can have various of modifications and changes. Any modification, equivalent, and improvement without departing from the spirit and principle of the present application fall into the protection scope of the present application.

What is claimed is:

1. A real handwriting stylus with a RF transceiver transmission function, comprising a stylus shell, a battery inside the stylus shell, a system circuit inside the stylus shell and touch pressure sensitive components inside the stylus shell,
   the touch pressure sensitive components include a nib, a nib touch switch and a nib pressure inductor;
   the system circuit includes a charging circuit, a power control and shutdown delay circuit, a power voltage conversion circuit, function keys, a RF modulation and RF transceiver and a signal generating circuit;
   the power voltage conversion circuit connects with the power control and shutdown delay circuit, and converts the system power into constant voltage power supply,
   the RF modulating and RF transceiver circuit connects with the nib pressure inductor and the function keys, whereby acquiring the nib pressure signals and the function key signals respectively, and RF modulating and outputting RF modulation signals; the RF modulating and RF transceiver circuit can receive radio-frequency signals, and output frequency-hopping signals to the signal generating circuit;
   the signal generating circuit can output electromagnetic signals and/or electrical signals; the signal generating circuit connects with the RF modulating and RF transceiver circuit, whereby acquiring frequency-hopping signals to proceed the frequency hopping operation;
   a power input port connecting with the battery, a power output port connecting with the power voltage conversion circuit, a touch switching signal control port connecting with the nib touch switch are arranged in the power control and shutdown delay circuit of the stylus system circuit; and
   the touch switching signal control port connects with the touch switch and acquires signals, upon the conducted signals of the touch switch have been acquired, the connection between the power input port and the power output port connect to each other, and the stylus system circuit enters a working condition.

2. The real handwriting stylus according to claim 1, wherein, the electromagnetic signals and/or electrical signals of the signal generating circuit include the nib hovering position signals and the nib trace signals.

3. The real handwriting stylus according to claim 1, wherein, the nib pressure inductor is a pressure sensitive resistor.

4. The real handwriting stylus according to claim 1, wherein, the nib pressure inductor is a pressure sensitive capacitor.

5. The real handwriting stylus according to claim 1, wherein, the stylus shell includes a stylus shell front end and a stylus shell rear end;
   a battery and a system circuit are arranged inside the stylus shell rear end, and the stylus shell rear end is made from metal conductive materials; and
   touch pressure sensitive components are arranged inside the stylus shell front end, and the stylus shell front end is made form insulating materials.

6. The real handwriting stylus according claim 1, wherein, the signal generating circuit connects with an electromagnetic signal output coils and outputs alternating electromagnetic signals, and the electromagnetic signal output coils are toroidal coils winded with metal wires with an insulating surface.

7. The real handwriting stylus according to claim 1, wherein, the signal generating circuit connects with an electrical signal radiating antenna and outputs electrical signals, and the electrical signal radiating antenna is an electrical conductor which is made from a section of conductor materials.

8. The real handwriting stylus according to claim 1, wherein, the signal generating circuit connects with an electrical signal radiating antenna and outputs electrical signals, and the nib which is made from conductor materials can also be used as an electrical signal radiating antenna.

9. The real handwriting stylus according to claim 1, wherein, the nib touches to generate pressures impacting on the nib touch switch and the nib pressure sensor.

10. The real handwriting stylus according to claim 1, wherein, if the short circuit conducted signals connected with the touch switch have not been received in the working condition for a long time, the connection between the power input port and the power output port is cut off, and the system circuit enters a shutdown status.

11. The real handwriting stylus according to claim 10, wherein, a power charging control port connecting with the charging circuit is also arranged in the power control and shutdown delay circuit of the stylus system circuit, upon the charging signals have been acquired from the power charging control port, it will enter the charging status, the connection between the power input port and the power output port is cut off, and the stylus system circuit is locked in the shutdown status.

12. A touch device with the RF transceiver transmission function, comprising a real handwriting stylus and a touch module with the RF transceiver transmission function; wherein the real handwriting stylus includes a stylus shell, a battery inside the stylus shell, a system circuit inside the stylus shell and touch pressure sensitive components inside the stylus shell; a power input port connecting with the battery, a power output port connecting with the power voltage conversion circuit, a touch switching signal control port connecting with the nib touch switch are arranged in the power control and shutdown delay circuit of the stylus system circuit; the touch switching signal control port connects with the touch switch and acquires signals, upon the conducted signals of the touch switch have been acquired, the connection between the power input port and the power output port is connected to each other, and the stylus system circuit enters a working condition; and the touch module includes a touch sensor, a touch processor and a RF transceiver connected with the touch processor, the touch module can receive the radio-frequency signals as well as the electromagnetic signals and/or electrical signals from the real handwriting stylus output.

13. The touch device according to claim 12, wherein, the RF transceiver circuit is a 2.4 GHZ RF transceiver circuit, including a blue-tooth transceiver circuit and/or a WIFI transceiver circuit.

14. The touch device according to claim 12, wherein, the touch module is an electromagnetic touch module, the electromagnetic touch module includes an electromagnetic touch sensor, an electromagnetic touch processor and a RF transceiver connected with the electromagnetic touch processor.

15. The touch device according to claim 14, wherein an electromagnetic touch sensor antenna unit of the electromagnetic touch sensor of the electromagnetic touch module receives alternating electromagnetic signals generated by the electromagnetic mode stylus via the electromagnetic output coils, then converts the alternating electromagnetic signals to the electromagnetic inductive signals and input into the electromagnetic touch processor, the RF transceiver circuit receives the radio-frequency signals transmitted by the real handwriting stylus via RF modulating and RF transceiver circuit, and transmits to the electromagnetic touch processor, the electromagnetic touch processor demodulates the signals to be recognized by an external device and transmit to the external device.

16. The touch device according to claim 12, wherein, the touch module is a capacitive touch module, the capacitive touch module includes a capacitive touch sensor, a capacitive touch processor and a RF transceiver circuit connecting with the capacitive touch processor.

17. The touch device according to claim 16, wherein, a capacitive touch inducting antenna unit of the capacitive touch sensor receives the electrical signals which is generated by the real handwriting stylus via the electrical signals radiating antenna, then converts the electrical signals into electrically induced signals and input into the capacitive touch processor, the RF transceiver circuit receives the radio-frequency signals transmitted by the real handwriting stylus via the RF modulating and the RF transceiver circuit, and then transmits to the capacitive touch processor, and the capacitive touch processor demodulates the signals to be recognized by an external device and transmit to the external device.

18. The touch device according to one of the claim 17, wherein, the signals to be recognized by the external device include the signals of the nib hovering position, nib trace signals, the signals of stylus pressure, and the signals of function keys.

19. The touch device according to any one of the claim 17, wherein, the external device is a capacitive touch sensor, an electromagnetic touch sensor, a computer and/or a cellphone.

20. The touch device according to claim 12, wherein, the touch module is an electromagnetic capacitive dual module, the electromagnetic capacitive dual module includes an electromagnetic module and a capacitive module; the electromagnetic module includes an electromagnetic touch sensor, an electromagnetic touch processor and a RF transceiver circuit, the capacitive module includes a capacitive touch sensor, a capacitive touch processor and a RF transceiver circuit.

21. The touch device according to claim 20, wherein, an electromagnetic touch sensor antenna unit of the electromagnetic touch module in the electromagnetic and capacitive dual module and a capacitive touch sensor antenna unit of the capacitive touch module acquire alternating electromagnetic signals and electrical signals respectively; the electromagnetic touch sensor antenna unit converts the alternating electromagnetic signals into electromagnetic inductive signals, and the electromagnetic inductive signals are input into the electromagnetic touch processor, the RF transceiver circuit receives the radio-frequency signals transmitted by the real handwriting stylus via the RF modulating and RF transceiver circuit, and transmits to the electromagnetic touch processor, the electromagnetic touch processor demodulates the radio-frequency signals to be recognized by an external device and transmit to the external device; a capacitive touch inducting antenna unit converts the electrical signals to electrically induced signals and input the electrically induced signals into the capacitive touch processor, the RF transceiver circuit receives the radio-frequency signals transmitted by the real handwriting stylus via the RF modulating and RF transceiver circuit, and transmits them to the capacitive touch processor, the capacitive touch processor demodulates the signals to be recognized by an external device and transmits to the external device.

22. The touch device according to claim 21, wherein, the electromagnetic touch module of the electromagnetic and capacitive dual touch module is arranged after the capacitive touch module, the electromagnetic touch processor transmits a shutdown signal of the capacitive touch module to the capacitive touch processor, whereby keeping the electromagnetic touch mode prior.

23. The touch device according to claim 21, wherein, the capacitive touch module of the electromagnetic and capacitive dual touch module is arranged after the electromagnetic touch module, the capacitive touch processor transmits a shutdown signal of the electromagnetic touch module to the electromagnetic touch processor, whereby keeping the capacitive touch mode prior.

* * * * *